United States Patent

[11] 3,618,700

[72] Inventors Edwin W. Bond
Issaquah;
Robert L. Lundeen, Seattle, both of Wash.
[21] Appl. No. 46,049
[22] Filed June 15, 1970
[45] Patented Nov. 9, 1971
[73] Assignee The Boeing Company
Seattle, Wash.

[54] RETRACTED NOISE SUPPRESSION SYSTEM
4 Claims, 9 Drawing Figs.
[52] U.S. Cl. .................................................. 181/33 HD,
181/33 G, 181/50, 181/64, 239/265.13,
239/265.39
[51] Int. Cl. ...................................................... B64d 33/06,
F01n 1/08
[50] Field of Search ..................... F01n/1/18; 181/33, 33 HA,
33 HB, 33 HC, 33 HD, 33 G, 43,
51, 42, 50, 64; 239/127.3, 265.11, 265.13, 265.17,
265.33, 265.37, 265.39, 265.41

[56] References Cited
UNITED STATES PATENTS
3,113,634 12/1963 Watters ........................... 181/33
3,477,231 11/1969 Paulson ........................... 181/33 G
3,533,486 10/1970 Paulson ........................... 181/50

FOREIGN PATENTS
1,525,355 4/1968 France ........................... 181/33 HD
921,127 3/1963 Great Britain ................. 181/33 HA Primary Examiner—Robert S. Ward, Jr.
Attorneys—Glenn Orlob and Bernard A. Donahue ABSTRACT: A mechanism for attenuating sound pressure levels in the fluid passageways of an aircraft jet engine comprising a plurality of pivotally attached vane members each having a pair of oppositely facing acoustically treated surfaces. The vane members are stowed for cruise flight in positions aligned along and parallel to the wall of the passageway, wherein fluid flow occurs over only one of said oppositely facing surfaces. The vanes are pivotable along axes parallel to the flow into operative noise suppression positions perpendicular to said wall in which flow occurs over each of said surfaces, thereby increasing attenuation of sound pressure levels in said passageway. The preferred embodiment involves a turbofan jet engine wherein the vane members are stowed along an outer wall in overlapping fashion and the means for pivotally moving the members comprises a power actuated ring member which pivotally displaces each vane into a radial position wherein adjacent vanes cooperate to form trapezoidal acoustic chambers to reflect and dampen sound pressure wave fronts.

PATENTED NOV 9 1971 3,618,700

INVENTORS,
EDWIN W. BOND
ROBERT L. LUNDEEN
BY
Bernard A. Donahue
ATTORNEY

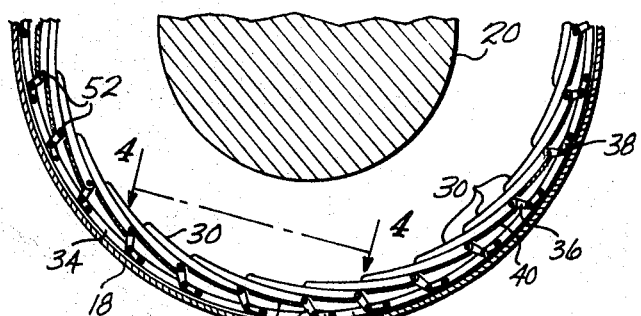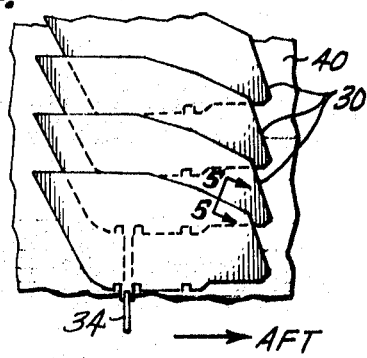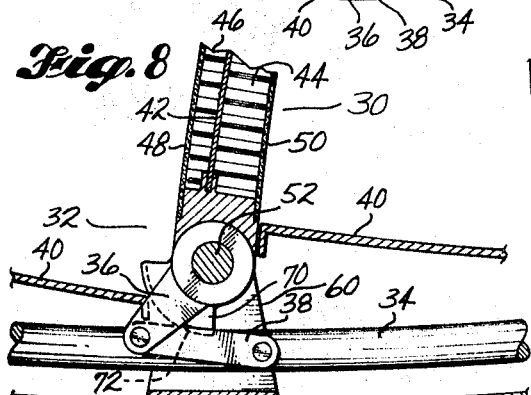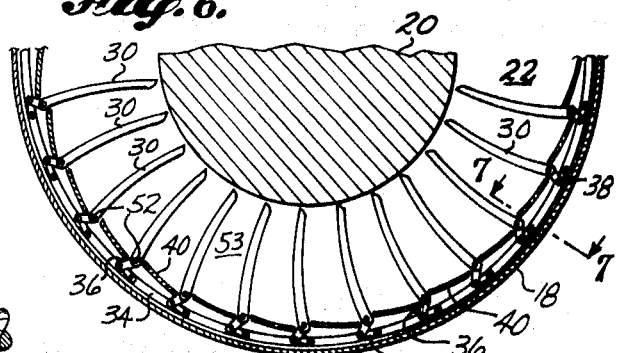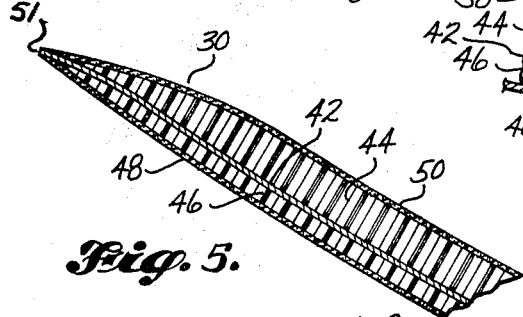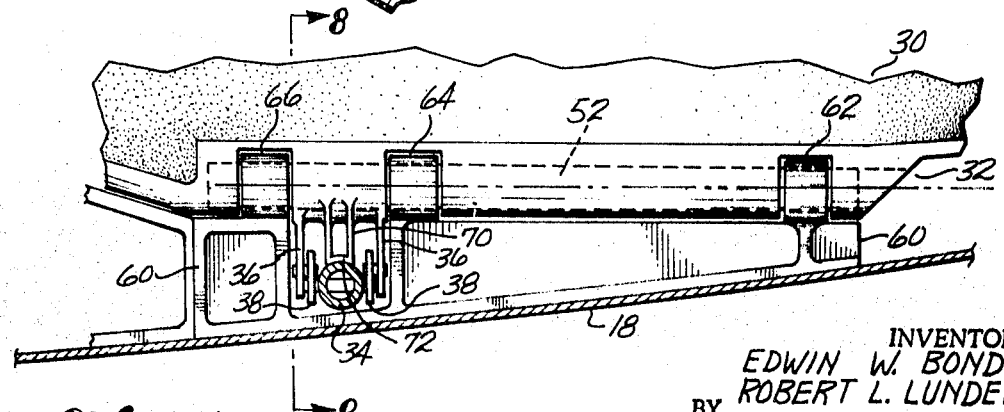

RETRACTED NOISE SUPPRESSION SYSTEM

FIELD OF THE INVENTION

This invention relates to aircraft jet engine noise suppression; and more particularly, to a mechanism for selectively increasing the acoustically treated wetted surface area in an inlet or exhaust passageway to thereby increase attenuation of sound pressure levels during low-speed flight.

DESCRIPTION OF THE PRIOR ART

It has been a recent practice to line all available wetted surfaces within an inlet or exhaust passageway with acoustically treated sound absorbing materials in order to maximize attenuation of sound emitted from the passageway. It is known that the addition of more treated surfaces by placing fixed members carrying acoustical surfaces in the fluid stream will further reduce sound levels. However, this expedient has not been widely used as it seriously interferes with the aerodynamic efficiency of the passageway during cruise flight, when maximum efficiency is required for economical operation.

It has also been known in certain complex prior art noise suppression systems to deploy fingerlike members in an exhaust passageway for the purpose of breaking up or redirecting flow patterns into smaller individual streams or passageways. However, such fingerlike members are relatively small and are used only for redirecting flow patterns or changing sound frequencies rather than attenuating sound pressure levels. Deployable fingerlike or plate members have also been used to choke air inlet passageways, thereby increasing fluid velocities to near-sonic magnitude to minimize the escape of noise upstream out of the forward end of the engine.

SUMMARY OF THE INVENTION

It is the general object of this invention to provide a simple mechanism for selectively obtaining increased noise attenuation during low-speed flight which does not adversely affect cruise performance.

It is a primary object of this invention to provide means for increasing the wetted area of acoustically treated surface in an engine passageway during low-speed flight which can be returned to a stowed position during cruise for minimum interference with aerodynamic efficiency of the passageway.

A related object of this invention is to provide a retractable vane member noise suppression system in which the vanes are arranged such that more vanes, and hence more wetted surface area in the operative position, may be conveniently designed into the system merely by spacing the vanes closer together and allowing them to overlap in the stowed position.

A further related objective of this invention is to provide an acoustically treated vane system of the class described in which the vanes, when deployed, are so arranged that each adjacent pair of vane members will cooperate with the walls of an annular passageway to establish sound suppression chambers which will serve to reflect and dampen moving sound pressure level wave fronts.

The above objectives are each achieved in the disclosed preferred embodiment of this invention, which was engineered for a particular turbofan engine and set of noise regulations, by the provision of some 28 acoustically treated vane members pivotally attached along the outer wall of the fan exhaust along axes which are parallel to the direction of flow in the passageway. The vane members are stowed for cruise flight in overlapping fashion along and parallel to the wall, thereby preventing flow over one of the acoustic surfaces of each member. A power-actuated ring member is operably connected to each vane member, and upon actuation will pivotally rotate each vane into an operative position where each vane extends radially substantially across the annular turbofan passageway, and where the entirely of both the acoustic surfaces of each vane is exposed to fluid flow, thereby more than doubling the exposed area of acoustic surface material, and increasing the attenuation of sound pressure levels accordingly. Each adjacent pair of vanes cooperates to establish a trapezoidal chamber for sound attenuation.

BRIEF DESCRIPTION OF THE DRAWINGS

FIG. 3 is a rear section view taken along lines 3—3 in FIG. 1.

FIG. 4 is a plan view showing applicants' noise attenuating vane members stowed for cruise flight taken at 4—4 in FIG. 3.

FIG. 5 is a section view through a vane member taken at 5—5 in FIG. 4.

FIG. 6 is a rear section view similar to FIG. 3 taken along lines 6—6 in FIG. 2 showing the vane members in an operative position.

FIG. 7 is a detailed plan view of applicants' vane member, hinge fitting, and power actuated ring member taken at 7—7 in FIG. 6.

FIG. 8 is a section view through the hinge fitting and vane member taken at 8—8 in FIG. 7 showing the vane deployed in an operative position.

FIG. 8A is a section view similar to FIG. 8 showing the vane members in the stowed position.

DESCRIPTION OF THE PREFERRED EMBODIMENT

Figure 1:
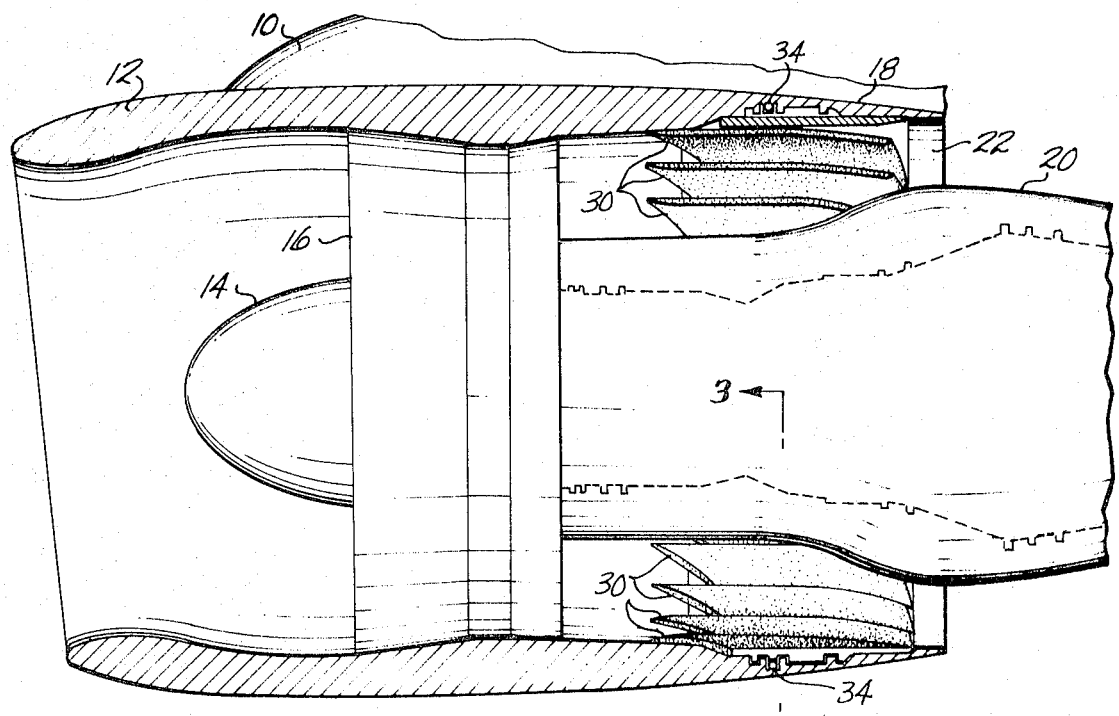
FIG. 1 is an elevation section view of an aircraft turbofan jet engine and nacelle structure wherein the fan exhaust duct is equipped with applicants' retractable sound suppression system, shown in the stowed position for cruise flight.

Referring now to FIG. 1, a high bypass ratio turbofan engine 10 is shown to include a forward fan cowling 12, an intake centerbody 14, a fan casing 16, and an aft fan cowling 18. Engine centerbody 20 can be seen to form an interior wall of an annular exhaust passageway 22; the exterior wall of this passageway being formed by the aft fan cowling 18. As will later become more apparent, a plurality of vane members 30 are arranged in overlapping fashion in a stowed, or cruise, position along the exterior wall.

Figure 2:
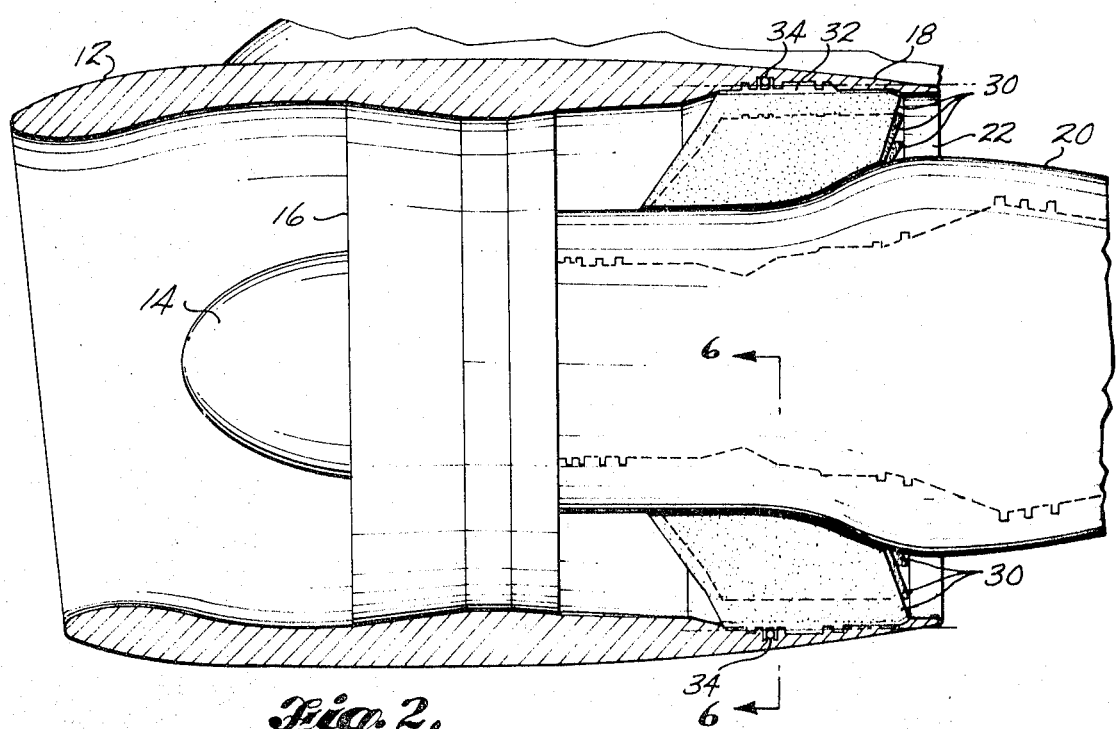
FIG. 2 is an elevation section view similar to FIG. 1 showing applicants' system in the operative position for maximum sound suppression during low-speed flight.

FIG. 2 shows the vane members 30 deployed for maximum sound attenuation during low-speed flight. The vane members 30 have been rotated about their hinge portions 32 on the longitudinally oriented centerline shown, into an operative position wherein they extend radially substantially across the annular passageway, conforming to, and coming into close proximity with, the local curvature of the engine centerbody 20. As will be made clearer by subsequent figures, a power-actuated ring member 34 is operably connected to each vane member 30, and, upon actuation, will rotate each vane into or out of either the operative position of FIG. 2 or the stowed position of FIG. 1.

FIG. 3 is a fragmented rear section view taken at 3—3 in FIG. 1, showing the vane members 30 held in stowed positions for cruise flight. The vane members 30 are held in overlapping stowed positions such that flow of exhaust fluid occurs over only a portion of the inner one of the pair of oppositely facing exterior surfaces of each vane member 30. As will be discussed more fully in connection with FIG. 5, each of the oppositely facing exterior surfaces is acoustically treated to maximize sound attenuation. Therefore, in the stowed position of FIG. 3, the vane member has substantially more than half of its acoustically treated surface area shielded from the fluid flow within the passageway. Also, it should be noted that in the stowed position the total exposed vane member surface area is substantially the same as the surface area of a circular outer wall of a conventional turbofan exhaust passageway. The power actuated ring member 34 can be seen to be connected to each vane member 30 at each vane lug 36 by means of links 38, and to be holding the members against the passageway fairing 40.

FIG. 4, taken at 4—4 in FIG. 3, is a plan view showing the overlapping of the leaflike vane members 30. In the stowed position shown, each member 30 has its outermost exterior surface resting against either the passageway fairing 40 or the innermost surface of the next adjacent member 30. The plan-form of each of the members 30 is tailored for the maximum area which will fit into the passageway 22 when the members are deployed into the radially extending operative positions of FIG. 2. The taper at the forward edge of each member is arranged for clearance with thrust reverser blocker flaps of a generally conventional type (not shown). The aft end of each member is tapered to clear the nozzle exit plane and ancillary equipment such as a variable area plug nozzle. Each peripheral edge other than the hinged edge is tapered and faired for aerodynamic cleanliness in either the stowed or operative position, as is best shown in the FIG. 5 edge section view taken at 5—5 in FIG. 4.

The FIG. 5 section view depicts the vane member 30 as comprising a central web 42, an inner honeycomb core 44, an outer honeycomb core 46, an outer perforated sheet exterior skin 48, an inner perforated sheet exterior skin 50, and a relatively sharp tip juncture 51. As will be understood by persons skilled in the acoustics art, the perforated sheets are provided with apertures of selected size, spacing and arrangement relative to the depth and size of the adjacent honeycomb core cells for maximum attenuation of sound pressure levels in selected frequency ranges. The web member, honeycomb core and skins are integrally constructed, e.g., by bonding, and connected to a hinge fitting to form a rigid vane member.

FIG. 6 is a view similar to the FIG. 3 rear view, showing the vane members 30 radially deployed in operative positions extending substantially across the annular passageway 22. The power actuated ring 34 has been circumferentially displaced clockwise (as shown) from the stowed position of FIG. 3, thereby rotating each vane member clockwise about pivot pin 52 by means of the link 38 and lug 36. Each adjacent pair of vane members 30 can be seen to form a generally trapezoidal chamber 53 bounded at the inner end by the centerbody 20 and at the outer end by the passageway fairing 40. Each trapezoidal chamber thus formed serves to trap and dampen reflecting sound pressure wave fronts in motion with the chamber. The surfaces of centerbody 20 and fairing 40 are preferably each acoustically treated for maximum attenuation.

FIG. 7 is a detailed plan view, taken at 7—7 in FIG. 6, of a structural pivot fitting 60 and the hinge portion 32 of a vane member 30. The pivot pin 52 is affixed to hinge portion 32 for movement therewith. The fitting 60 is preferably a machined casting which includes fitting lugs 62, 64, and 66, within which the pivot pin 52 is free to rotate. The hinge portion 32 is likewise preferably a machined casting which includes a pair of lugs 36 disposed and arranged for attachment to ring 34 through side links 38 by means of pivot pins as shown. In this embodiment the hinge portion 32 further includes means for centering the ring member 34 with respect to the lugs 36, in the form of a centering guide lug 70, having a contoured surface 72, serving to prevent undesired lateral motion of the ring, and to support the ring concentric with the engine passageway.

A detailed section of the hinge-to-ring attachment is provided by FIG. 8, taken at 8—8 in FIG. 7. The hinge fitting 60 is rigidly affixed to the aft cowl 18, and pivotally supports pivot pin 52 and hinge portion 32. The power-actuated ring 34 is nested against contoured surface 72 of guide lug 70, and connected to the vane lug 36 by pin-ended links 38. The vane member 30 is depicted in an operative position radially deployed in the annular passageway.

FIG. 8A is a detailed section similar to FIG. 8 with the exception that the vane members 30 are shown held in their stowed positions. The power actuated ring 34 has been displaced counterclockwise as shown, thereby rotating the vane members 30 into their stowed positions, in which each outer surface skin 48 is in nesting contact with its corresponding support surface 40. The particular embodiment shown involves specific geometric and acoustic restraints wherein the vane members have been sized to extend across the passageway and also are spaced apart a distance less than their radial length, and therefore they necessarily overlap when stowed. The support surfaces 40 are preferably located such that in the overlap areas the inner surface skins 50 are in nesting contact with the outer surface skins 48 of the next adjacent vane member, thereby preventing undesired stray flow patterns between members.

Based on the foregoing description, it is apparent that applicants' system provides a relatively simple means for selectively increasing the wetted area of acoustic materials in an engine fluid passageway where it is desired to maximize sound attenuation, and further that this objective is achieved with a minimum of interference with propulsive efficiency when the system is returned to the stowed position for high speed cruise flight. Many variations of the preferred embodiment shown will be apparent to persons skilled in this art. For example, it will readily be recognized that increasing the spacing between vane members 30 could eliminate overlapping of the vane members in the stowed position. If this reduction in sound absorption capability is acceptable, a cleaner aerodynamic passageway wall and a simpler installation will result. It is also apparent that the apparatus concepts involved here are applicable to either an engine inlet passageway or a primary exhaust passageway with no more than routine engineering modifications. Therefore, it is intended in the appended claims to cover all such variations and modifications.

What we claim and desired to be secured by Letters Patent is:

1. In combination with a jet engine having annular exhaust passageway walls formed by an outer cowling structure and the engine center body structure, a mechanism for attenuating sound pressure levels comprising:

a plurality of vane members having oppositely facing exterior surfaces which are acoustically treated; said vane members being pivotally mounted within said passageway on said outer cowling structure on axes aligned parallel to the direction of flow of exhaust gases, and being so sized and spaced apart from one another that they may be radially deployed to extend substantially across said annular passageway to thereby form a substantially closed trapezoidal chamber between each adjacent vane member to reflect and dampen sound pressure levels within said passageway; and means for pivotally moving said vane members from their radially deployed positions into stowed positions adjacent to the surface of the outer cowling surface and wherein the outer face of each vane member is disposed in overlapping fashion upon the inner face of a next adjacent vane member to thereby prevent stray airflow between vane members and to minimize drag within the passageway for cruise flight.

2. The mechanism of claim 1 wherein said means for pivotally moving said vane members comprises a power actuated ring member which is operably connected to each of said vane members.

3. The mechanism of claim 1 wherein said vane members comprise thin aerodynamically clean airfoil sections having tapered leading and trailing edges which extend substantially across said annular passageway when disposed in said operative positions.

4. The mechanism of claim 3 wherein each of said vane members comprises:

perforated sheet exterior skin members,
honeycomb core attached to said skin members,
a hinge fitting connected to said honeycomb core having a lug member disposed for attachment to said means for pivotally moving said members, wherein said skin members, honeycomb core and hinge fittings are integrally constructed and connected to form a rigid vane member, and wherein said hinge fitting further comprises means for centering said ring member with respect to said vane member.

\* \* \* \* \*